United States Patent
Chumas et al.

(10) Patent No.: US 8,860,577 B1
(45) Date of Patent: Oct. 14, 2014

(54) MOTION-ACTIVATED HUNTING LIGHT

(76) Inventors: Charles F. Chumas, Blue Point, NY (US); Charles J. Chumas, Blue Point, NY (US)

( * ) Notice: Subject to any disclaimer, the term of this patent is extended or adjusted under 35 U.S.C. 154(b) by 331 days.

(21) Appl. No.: 13/311,793

(22) Filed: Dec. 6, 2011

(51) Int. Cl.
*G08B 23/00* (2006.01)

(52) U.S. Cl.
USPC ............... 340/573.2; 340/573.1; 340/540; 248/127; 248/157; 248/161; 248/163.1

(58) Field of Classification Search
CPC . A01M 31/00; A01M 31/002; A01M 31/004; A01M 31/008; A01M 31/02; A01M 31/025; A01M 99/00
USPC ........... 340/500, 540, 573.1, 573.2, 551, 552, 340/561, 565; 248/127, 161, 411, 157, 248/163.1
See application file for complete search history.

(56) References Cited

U.S. PATENT DOCUMENTS

| | | | | |
|---|---|---|---|---|
| 5,195,611 | A * | 3/1993 | Untz | 182/187 |
| D338,845 | S | 8/1993 | Rohrs | |
| 5,307,053 | A * | 4/1994 | Wills et al. | 340/573.1 |
| 5,517,201 | A | 5/1996 | Thompson, Jr. | |
| 5,939,987 | A * | 8/1999 | Cram | 340/573.2 |
| 5,988,573 | A * | 11/1999 | Mueller | 248/177.1 |
| 6,053,282 | A * | 4/2000 | Morisak | 182/115 |
| 6,118,375 | A * | 9/2000 | Duncan | 340/541 |
| 6,195,310 | B1 | 2/2001 | Morgan, II | |
| 6,414,906 | B1 * | 7/2002 | Gaspari | 367/139 |
| 6,483,254 | B2 * | 11/2002 | Vo et al. | 315/241 S |
| 6,637,904 | B2 * | 10/2003 | Hernandez | 362/8 |
| 7,079,027 | B2 | 7/2006 | Wojcik | |
| 7,944,354 | B2 * | 5/2011 | Kangas et al. | 340/568.5 |
| 8,541,949 | B2 * | 9/2013 | Donners | 315/129 |
| 2002/0145519 | A1 * | 10/2002 | Hykawy | 340/567 |
| 2003/0201874 | A1 | 10/2003 | Wu | |
| 2005/0268521 | A1 * | 12/2005 | Cox et al. | 42/130 |
| 2006/0097882 | A1 * | 5/2006 | Brinkerhoff et al. | 340/573.2 |
| 2008/0157983 | A1 * | 7/2008 | Dir et al. | 340/573.2 |
| 2012/0181979 | A1 * | 7/2012 | Hudspeth et al. | 320/108 |

* cited by examiner

*Primary Examiner* — Steven Lim
*Assistant Examiner* — Ryan Sherwin

(57) ABSTRACT

The motion-activated hunting light includes a telescoping tripod that includes a plurality of motion sensors that are directed around the tripod in order to form 360 degrees of surveillance. The motion-activated hunting light includes a red light that is illuminated once at least one of the motion sensors is activated. The red light may illuminate for a pre-determined amount of time, and provides a warning to persons in the immediate vicinity of the hunting light. After a pre-determined amount of time of illumination of the red light, at least one spotlight shall illuminate in order to alert a hunter to the presence of a wild game. An optional speaker may work in conjunction with the spotlight to provide an audible alarm or to broadcast sounds that lure in a predatory animal and work as an audible luring means.

2 Claims, 4 Drawing Sheets

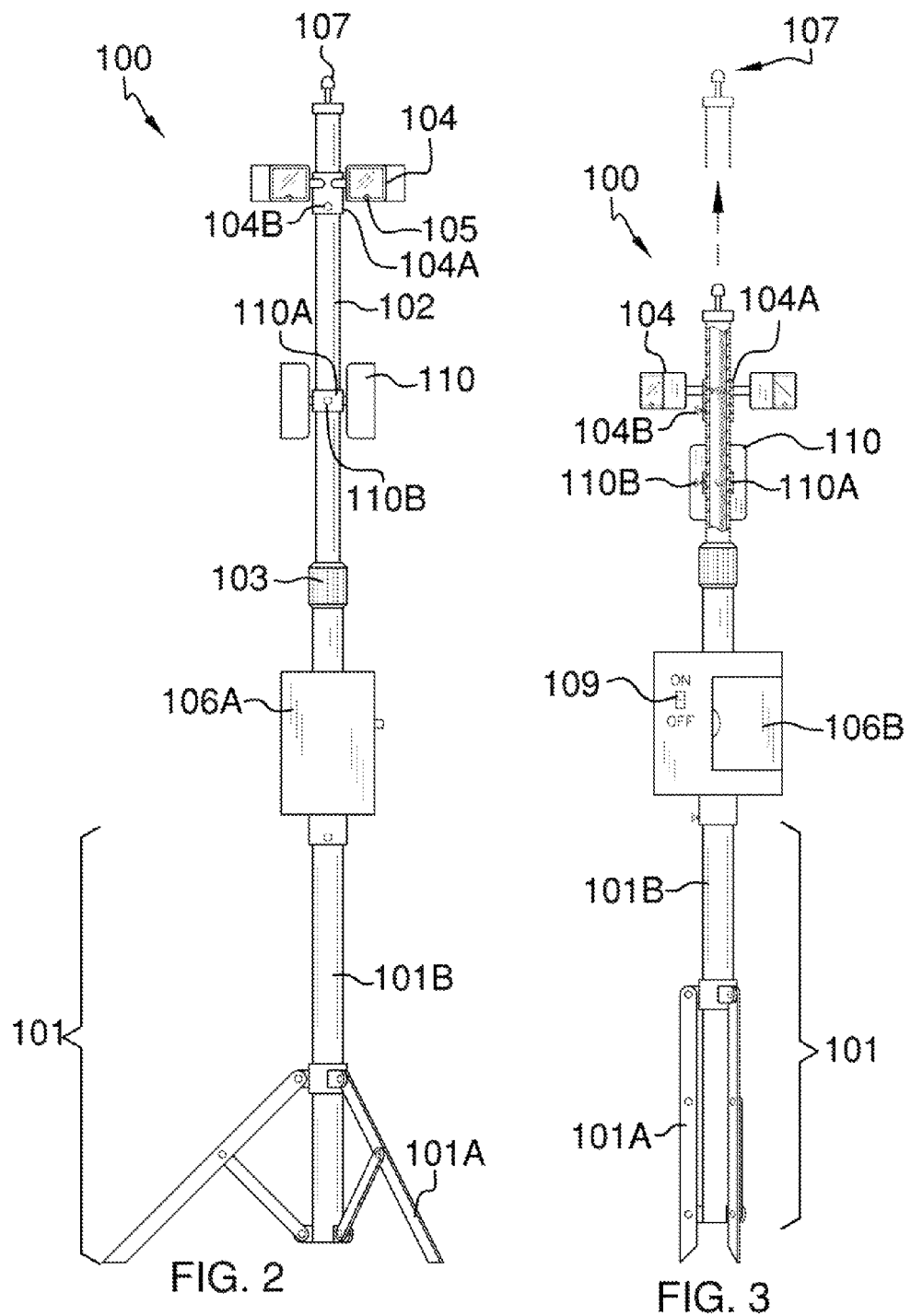

MOTION-ACTIVATED HUNTING LIGHT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of hunting accessories, more specifically, a motion-activated hunting light.

B. Discussion of the Prior Art

As will be discussed immediately below, no prior art discloses a hunting light system that is composed of a telescoping tripod that includes a plurality of motion sensors at or near the top of said tripod; wherein the motion sensors are directed around the tripod in order to form 360 degrees of motion-based surveillance; whereupon activation of any one of the motion sensors, a red warning light will illuminate; subsequent to illumination of the red light by a predetermined period of time, lights and speakers will activate; wherein the red warning light is included to offer a warning to hunters within the near vicinity of the device whereas the lights and speakers offer a warning to hunters not within the immediate vicinity of the device; wherein the speaker may be used to lure in predatory animals for subsequent hunting purposes.

The Wojcik patent (U.S. Pat. No. 7,079,027) discloses a motion detecting system for alerting a hunter when the detector is triggered. However, the system relies upon multiple detecting locations as opposed to a single location with which a plurality of motion sensors are directed to form 360 degree surveillance, and which is mounted atop a telescoping tripod.

The Wills et al. patent (U.S. Pat. No. 5,307,053) discloses a hunter alert device that notifies a hunter when wild game is in range. Again, the hunter alert device is not a telescoping tripod atop of which is provided with a plurality of motion sensors that form a 360 degree surveillance.

The Morgan, II patent (U.S. Pat. No. 6,195,310) discloses a monitoring device for assisting hunters seeking to view animals in wild game trails; wherein the device includes a motion sensor and hunter alerting system. Again, the monitoring device is not a telescoping tripod having a plurality of motion sensors directed to form 360 degrees of surveillance, and upon detection shall illuminate a red warning light, and subsequently shall activate lights and speakers.

The Thompson, Jr. patent (U.S. Pat. No. 5,517,201) discloses a motion detector monitoring system that detects the presence of wild game. Again, the motion detector monitoring system does not feature a single detection location upon a telescoping tripod that when activated shall illuminate a red warning light prior to activation of lights and speakers.

The Wu Patent Application Publication (U.S. Pub. No. 2003/0201874) discloses a shrew expelling device that has an illumination source that is activated when triggered. However, the device is not directed to motion sensing of wild game via a single location, and which shall activate a red warning light before activation of lights and speakers.

The Rohrs Patent (U.S. Pat. No. Des. 338,845) illustrates an ornamental design for a light and motion sensor, which does not depict a telescoping tripod with motion sensors directed around the tripod thereby forming a 360 degree surveillance.

While the above-described devices fulfill their respective and particular objects and requirements, they do not describe a hunting light system that is composed of a telescoping tripod that includes a plurality of motion sensors at or near the top of said tripod; wherein the motion sensors are directed around the tripod in order to form 360 degrees of motion-based surveillance; whereupon activation of any one of the motion sensors, a red warning light will illuminate; subsequent to illumination of the red light by a predetermined period of time, lights and speakers will activate; wherein the red warning light is included to offer a warning to hunters within the near vicinity of the device whereas the lights and speakers offer a warning to hunters not within the immediate vicinity of the device; wherein the speaker may be used to lure in predatory animals for subsequent hunting purposes. In this regard, the motion-activated hunting light departs from the conventional concepts and designs of the prior art.

SUMMARY OF THE INVENTION

The motion-activated hunting light includes a telescoping tripod that includes a plurality of motion sensors that are directed around the tripod in order to form 360 degrees of surveillance. The motion-activated hunting light includes a red light that is illuminated once at least one of the motion sensors is activated. The red light may illuminate for a predetermined amount of time, and provides a warning to persons in the immediate vicinity of the hunting light. After a pre-determined amount of time of illumination of the red light, at least one spotlight shall illuminate in order to alert a hunter to the presence of a wild game. An optional speaker may work in conjunction with the spotlight to provide an audible alarm or to broadcast sounds that lure in a predatory animal and work as an audible luring means.

It is an object of the invention to provide a portable hunting light that provides 360 degrees of surveillance by mounting multiple motion sensors on a tripod.

A further object of the invention is to provide a tripod that telescopes in order to adjust the elevation of the motion sensors.

A further object of the invention is to provide a red light that illuminates upon activation of at least one motion sensor, and which shall provide a warning to a person in the near vicinity of the apparatus.

A further object of the invention is to provide at least one spotlight that shall illuminate after a pre-determined amount of time has elapsed since the motion sensor has become activated.

An even further object of the invention is to provide a delay circuit that can produce the pre-determined amount of time between first activation of the motion sensor and illumination of the spotlight.

A further object of the invention is to provide an optional speaker or speakers that activate in conjunction with the spotlight in order to provide both a visual alarm as well as an audible alarm.

An even further object of the invention is to provide the speaker for use as an audible luring means, which plays pre-recorded audio sounds that lure in predatory animals.

A further object of the invention is to provide a powering means that enables the hunter light to be portable by including at least one battery.

These together with additional objects, features and advantages of the motion-activated hunting light will be readily apparent to those of ordinary skill in the art upon reading the following detailed description of presently preferred, but nonetheless illustrative, embodiments of the motion-activated hunting light when taken in conjunction with the accompanying drawings.

In this respect, before explaining the current embodiments of the motion-activated hunting light in detail, it is to be understood that the motion-activated hunting light is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the motion-activated hunting light.

It is therefore important that the claims be regarded as including such equivalent construction insofar as they do not depart from the spirit and scope of the motion-activated hunting light. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 illustrates a side view of the motion-activated hunting light;

FIG. 3 illustrates a side view of the motion-activated hunting light in which an arrow indicates adjustment of the telescoping portion of the tripod as well as the legs of said tripod being retracted;

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
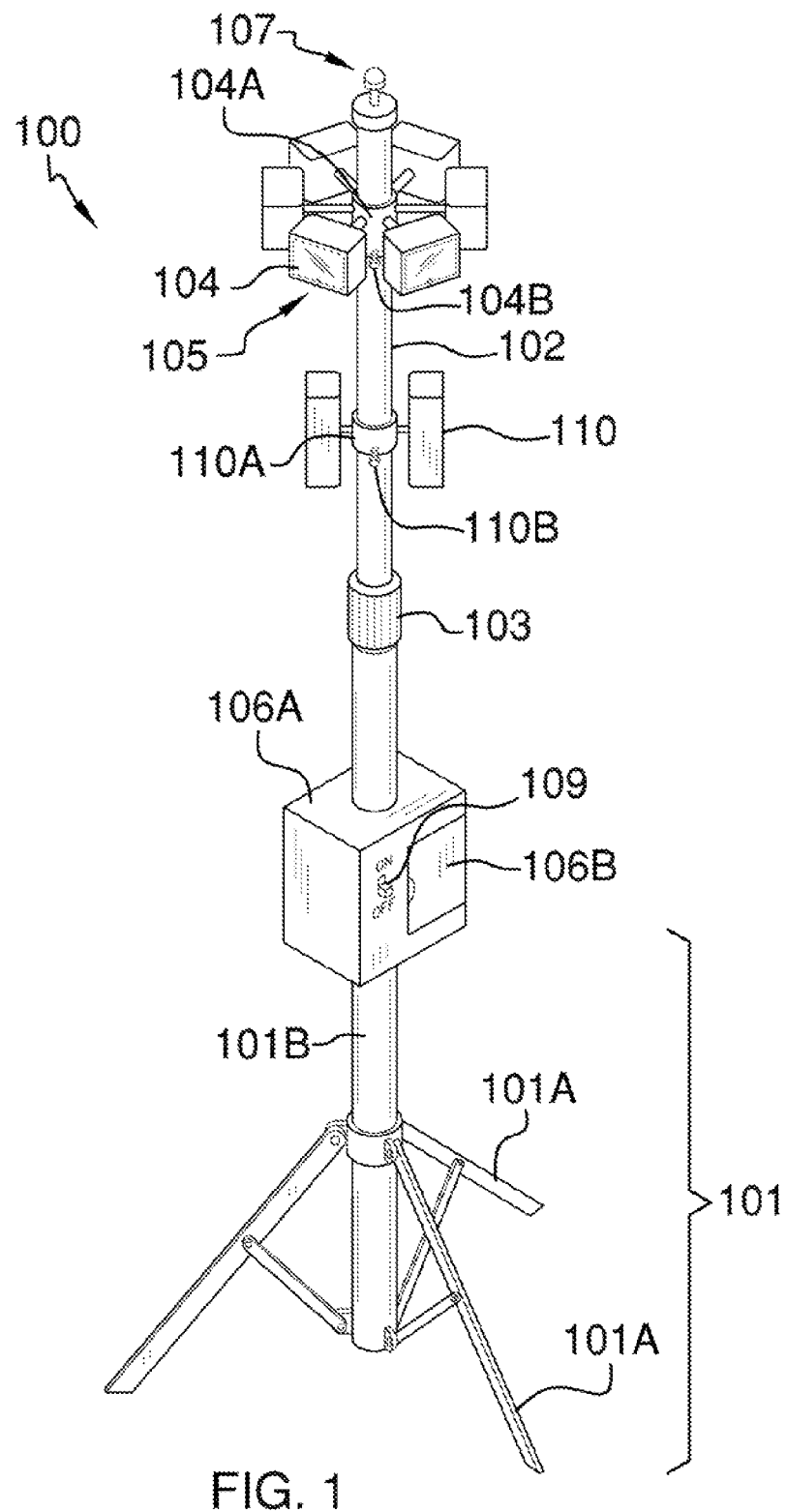
FIG. 1 illustrates a perspective view of the motion-activated hunting light by itself.
Figure 4:
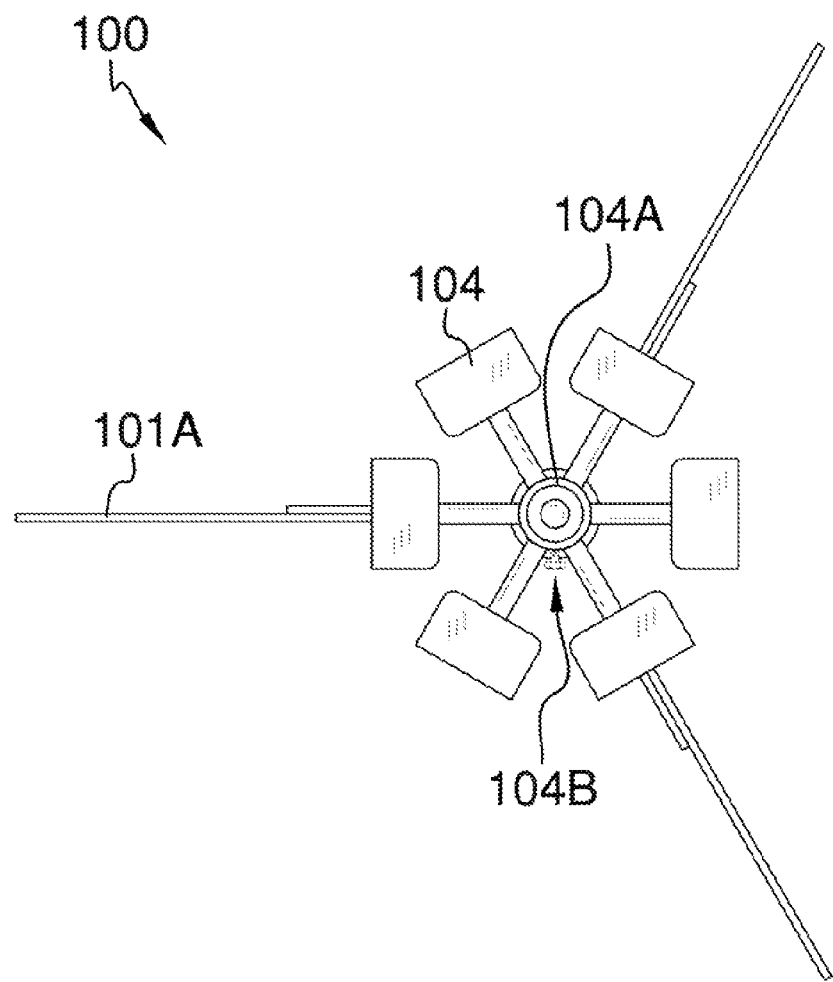
FIG. 4 illustrates a top view of the motion-activated hunting light.
Figure 5:
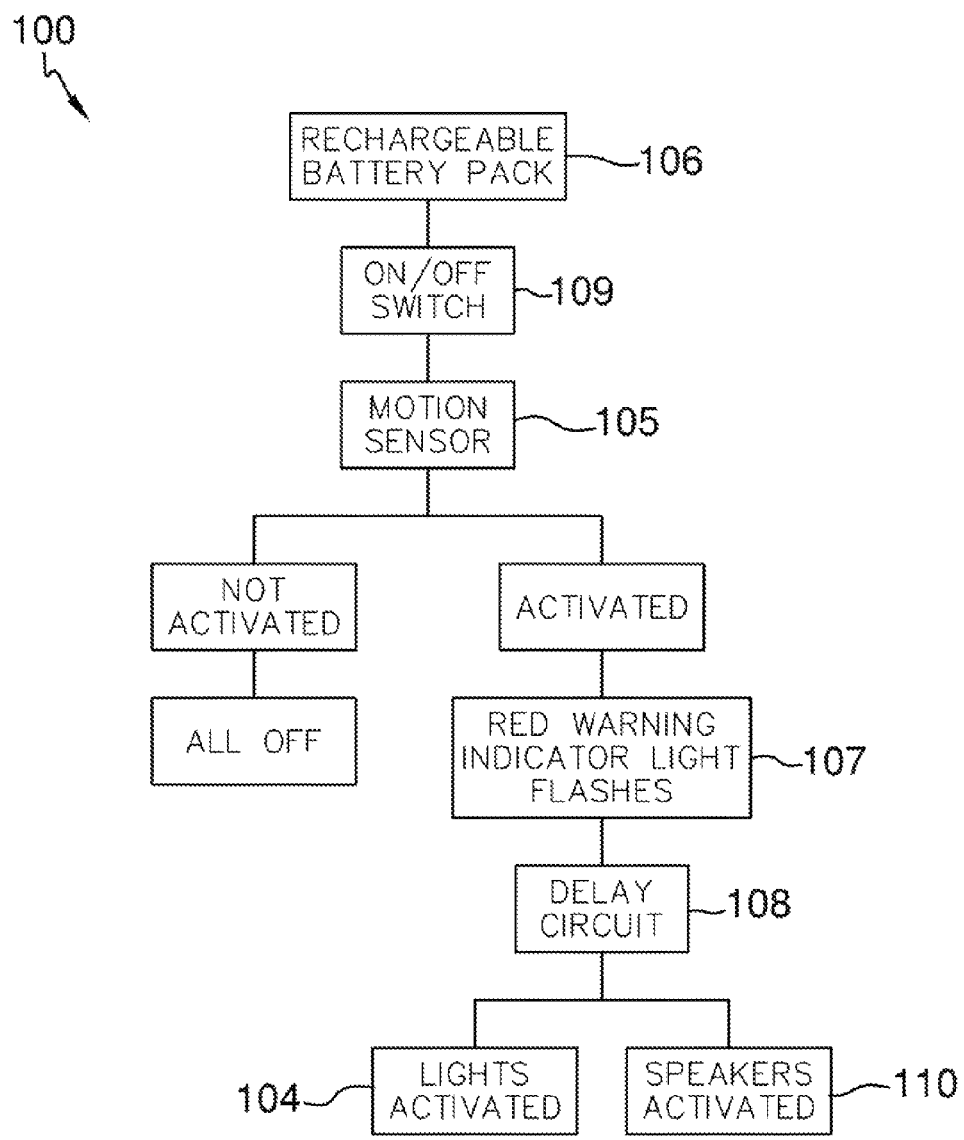
FIG. 5 illustrates a block diagram of the various components used to operate the motion-activated hunting light.

Detailed reference will now be made to the preferred embodiment of the present invention, examples of which are illustrated in FIGS. 1-5. A motion-activated hunting light 100 (hereinafter invention) includes a tripod 101 that employs at least three legs 101A to rotate away from a main body 101B. A telescoping member 102 extends from the main body 101B and can be selectively adjusted with respect thereto via a clamping means 103, which is well known in the art, and usually comprises a threaded member that creates a clamping force upon tightening.

Obviously, the outer diameter of the telescoping member 102 shall be less than the inner diameter of the main body 101B so as to enable telescoping motion there between. Attached on the telescoping member 102 is a plurality of lights 104. The lights 104 encircle the telescoping member 102, and are directed around the invention 100 in order to provide 360 degrees of lighting. It shall be noted that the lights 104 may be LEDs or incandescent. The lights 104 each include a motion sensor 105 thereon, which shall offer 360 degrees of surveillance there from. The motion sensors 105 are all in wired communication with one another, and with a powering means 106.

Upon detection of motion by any one of the motion sensors 105, the powering means 106 shall transmit power to a red warning light 107. The warning light 107 acts as a warning to individuals in close proximity of the invention 100. The warning light 107 is placed atop the telescoping member 102.

The lights 104 are also wired to the powering means 106, and shall illuminate after a pre-determined amount of time has elapsed since the first motion sensor 105 has been activated. The pre-determined amount of time is a delay that is produced via a delay circuit 108 that is in wired connection between the warning light 107 and the lights 104.

An on/off switch 109 is in wired communication between the powering means 106 and the motion sensors 105. The on/off switch 109 enables the invention 100 to be turned on or off as needed in order to preserve the powering means 106. It shall be noted that the term powering means 106 is hereby being used to refer to at least one battery that is stored within a housing 106A positioned on the tripod 101. A battery compartment 106B is provided on the housing 106A in order to provide access to the powering means 106 located therein. It shall be noted that the battery may be replaceable and/or rechargeable.

The lights 104 extend from a light bracket 104A that is a hollowed cylinder capable of sliding up and down the telescoping member 102. A locking screw 104B shall be provided in order to adjust the location of the light bracket 104A and the lights 104 at a desired elevation with respect to the invention 100.

The invention 100 may include at least one speaker 110 that shall emit an audible alarm in conjunction with the lights 104, and simultaneous with the illumination of the lights 104. The speaker 110 may extend from the telescoping section 102 via a speaker bracket 110A and set screw 110B. The speaker 110 shall be in wired communication with the powering means 106 in a manner consistent with the lights 104 described above.

The invention 100 may include the speaker(s) 110 to broadcast an audio file that acts as an audible luring means to lure in predatory animals in order to subsequently hunt said animals. It shall be noted that the use of the speaker(s) 110 may work only as the audible luring means or in conjunction with the audible alarm to emit the audible alarm upon the presence of the predatory animal.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A motion-activated hunting light comprising: a tripod on which a plurality of lights are provided and aimed around the tripod in order to provide 360 degrees of illumination; wherein a plurality of motion sensors are directed around the tripod and upon detection of motion shall illuminate a warning light for a predetermined amount of time before illuminating the plurality of lights; wherein the tripod is further defined by at least three legs that can extend and retract with respect to a main body; wherein a telescoping section extends and retracts from said main body in order to adjust the elevation of the plurality of motion sensors and plurality of lights thereon; wherein a clamping means secures the telescoping section at a desired position with respect to the main body; wherein the warning light is positioned atop the telescoping section; wherein the plurality of motion sensors, the plurality of lights, and the warning light are in wired communication with a powering means; wherein the powering means includes at least one battery, and is in wired communication with an on/off switch; wherein the predetermined amount of time is produced via a delay circuit positioned in wired communication between the plurality of lights and the warning light; wherein at least one speaker is in wired communication to the powering means and produces an audible alarm in simultaneous use with the plurality of lights; wherein said at least one speaker is used to emit an audible luring means that lures in a predatory animal before use as said audible alarm; wherein the plurality of lights attach to a light bracket that can slide up and down the telescoping section, and which includes a locking screw to secure the light bracket and the plurality of lights at a desired elevation with respect to the tripod; wherein the at least one speaker includes a speaker bracket and locking screw to adjust and secure the speaker bracket and the at least one speaker at a desired elevation with respect to the tripod; wherein the light bracket is positioned above the speaker bracket.

2. The motion-activated hunting light as described in claim 1 wherein the warning light is red.

\* \* \* \* \*